(12) United States Patent
Ciola et al.

(10) Patent No.: US 10,961,879 B1
(45) Date of Patent: Mar. 30, 2021

(54) SENSOR ASSEMBLY FOR A SLIDING CAMSHAFT OF A MOTOR VEHICLE

(71) Applicant: GM Global Technology Operations LLC, Detroit, MI (US)

(72) Inventors: Daniele Ciola, Turin (IT); Davide Di Nunno, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 24 days.

(21) Appl. No.: 16/564,077

(22) Filed: Sep. 9, 2019

(51) Int. Cl.
| | |
|---|---|
| F01L 1/34 | (2006.01) |
| F01L 13/00 | (2006.01) |
| F01L 1/047 | (2006.01) |
| F02D 13/02 | (2006.01) |
| F02D 41/00 | (2006.01) |
| G01D 5/26 | (2006.01) |
| G01D 5/14 | (2006.01) |
| G01D 5/16 | (2006.01) |
| G01D 5/20 | (2006.01) |

(52) U.S. Cl.
CPC ........... *F01L 13/0042* (2013.01); *F01L 1/047* (2013.01); *F02D 13/0203* (2013.01); *F02D 41/009* (2013.01); *F02D 41/0097* (2013.01); *F01L 2013/0078* (2013.01); *F01L 2820/041* (2013.01); *G01D 5/142* (2013.01); *G01D 5/16* (2013.01); *G01D 5/20* (2013.01); *G01D 5/26* (2013.01)

(58) Field of Classification Search
CPC .............. F02D 41/009; F02D 41/0097; F02D 13/0203; F01L 13/0042; F01L 1/047; F01L 2820/041; F01L 2013/0078; G01D 5/20; G01D 5/142; G01D 5/26; G01D 5/16
See application file for complete search history.

(56) References Cited

U.S. PATENT DOCUMENTS

| | | | |
|---|---|---|---|
| 10,006,323 | B2 | 6/2018 | Gallon |
| 10,024,206 | B2 | 7/2018 | Boyle et al. |
| 10,329,971 | B2 | 6/2019 | Verner et al. |
| 2001/0017114 | A1* | 8/2001 | Mikame .............. F01L 13/0042 123/90.15 |

* cited by examiner

*Primary Examiner* — Zelalem Eshete
(74) *Attorney, Agent, or Firm* — Vivacqua Crane

(57) ABSTRACT

A sensor assembly for a sliding camshaft of a motor vehicle is provided. The sliding camshaft includes a base shaft that extends along a longitudinal axis and rotates about the longitudinal axis. The sliding camshaft further includes lobe banks rotationally fixed to the base shaft. Each lobe bank is axially movable between first and second positions relative to the base shaft. The sensor assembly includes a detection element rotationally fixed relative to the base shaft and axially movable between first and second positions relative to the base shaft. The sensor assembly further includes a sensor operably coupled to the detection element and configured to generate a signal indicative of an axial position of the detection element relative to the base shaft and at least one of an angular speed of the base shaft and an angular position of the base shaft about the longitudinal axis.

18 Claims, 15 Drawing Sheets

SENSOR ASSEMBLY FOR A SLIDING CAMSHAFT OF A MOTOR VEHICLE

INTRODUCTION

The present invention generally relates to sliding camshafts for variable valve actuation systems of internal combustion engines for use in motor vehicles, and more particularly relates to a sensor assembly for detecting multiple parameters associated with variable valve actuation systems.

BACKGROUND

Automotive manufacturers are continuously developing variable valve actuation systems for diesel engines and gasoline engines. For example, a variable valve lift (VVL) system fora gasoline internal combustion engine (ICE) can include one or more camshafts each having low-lift cams and high-lift cams that actuate the intake valves and the exhaust valves. The low-lift cams and the high-lift cams are movable along a longitudinal axis of the camshaft to at least two positions per cylinder, and the high-lift and low-lift cams are rotationally locked relative to the camshaft. The VVL system uses the low-lift cams to operate the valves under regular or partial load conditions to promote fuel economy, and the VVL system uses the high-lift cams to increase valve travel under higher loads, so as to increase flow of air-fuel mixture into the engine to improve vehicle performance.

The VVL system includes a plurality of sensors electrically coupled to one or more wire harnesses for sending signals to an Engine Control Unit (ECU). In particular, the VVL system can include a plurality of barrel sensors for detecting the axial position of each camshaft barrel along the longitudinal axis. Each barrel sensor is configured to detect only the axial positions of the camshaft barrel and associated lobes. In addition, the VVL system can also include a camshaft trigger wheel rotationally locked to the camshaft and a camshaft sensor operably coupled to the camshaft trigger wheel for generating a signal. The ECU can use this signal to synchronize a crankshaft sensor during engine cranking or startup, such that the ECU can determine whether a cylinder is disposed in a compression stroke or an exhaust stroke. After synchronization, the ECU can use only the signal from the crankshaft sensor to determine whether a cylinder is disposed in a compression stroke or an exhaust stroke. If the crankshaft sensor malfunctions, the ECU may utilize the signal from camshaft sensor to determine the stroke of the cylinder and actuate the valves in response to same. During their life cycle, the sensors may experience mechanical damage, internal short circuits, or interrupted connection with the ECU.

Thus, while current sensors for variable valve actuation systems achieve their intended purpose, there is a need for a new and improved sensor assembly that addresses these issues.

BRIEF SUMMARY

According to several aspects, a sensor assembly for a sliding camshaft of a motor vehicle is provided. The sliding camshaft includes a base shaft that extends along a longitudinal axis and is rotatable about the longitudinal axis. The sliding camshaft further includes a plurality of lobe banks rotationally fixed to the base shaft. Each lobe bank is axially movable between first and second positions relative to the base shaft. The sensor assembly includes a detection element rotationally fixed relative to the base shaft and axially movable between first and second positions relative to the base shaft. The sensor assembly further includes a sensor operably coupled to the detection element with the sensor being configured to generate a signal indicative of an axial position of the detection element relative to the base shaft and at least one of an angular speed of the base shaft and an angular position of the base shaft about the longitudinal axis.

In one aspect, the detection element includes first and second annular profiles that are formed on a camshaft barrel and are different from one another. The first annular profile is associated with the camshaft barrel being disposed in the first position, and the second annular profile is associated with the camshaft barrel being disposed in the second position.

In another aspect, the detection element is further axially movable relative to the base shaft to a third position, and the detection element includes a third annular profile that is formed on the camshaft barrel and is different from the first and second annular profiles. The third annular profile is associated with the camshaft barrel being disposed in a third position.

In another aspect, the first, second, and third annular profiles each form an arrangement of surface elevations about the longitudinal axis.

In another aspect, the sensor is positioned to scan the first annular profile of the camshaft barrel when the detection element is axially disposed in the first position and the base shaft rotates about the longitudinal axis, such that the sensor generates a first signal indicative of the angular position of the base shaft, the angular speed of the base shaft, and the first position of the camshaft barrel.

In another aspect, the sensor is positioned to scan the second annular profile of the camshaft barrel when the detection element is axially disposed in the second position and the base shaft rotates about the longitudinal axis, such that the sensor generates a second signal indicative of the angular position of the base shaft, the angular speed of the base shaft, and the second position of the camshaft barrel.

In another aspect, the sensor is positioned to scan the third annular profile of the camshaft barrel when the detection element is axially disposed in the third position and the base shaft rotates about the longitudinal axis, such that the sensor generates a third signal indicative of the angular position of the base shaft, the angular speed of the base shaft, and the third position of the camshaft barrel.

In another aspect, the first, second, and third signals are different from one another.

In another aspect, the sensor is one of an optical sensor, an inductive sensor, a Hall effect sensor, and a magnetoresistive sensor.

According to several aspects, a sliding camshaft for a variable valve actuation system of a motor vehicle is provided. The sliding camshaft includes a base shaft that extends along a longitudinal axis and is adapted to rotate about the longitudinal axis. The sliding camshaft further includes a shuttle body rotationally fixed to the base shaft and axially movable between first and second positions relative to the base shaft. The sliding camshaft further includes first and second lobe banks mounted to the shuttle body. Each of the first and second lobe banks includes a first cam having a first cam profile configured to move a valve when the shuttle body is moved to the first position. In addition, each of the first and second lobe banks further includes a second cam having a second cam profile configured to move the valve when the shuttle body is moved to the second position, with the first and second cam profiles being different from one another. The sliding camshaft further includes a sensor assembly having a detection element mounted to the shuttle body. The sensor assembly further includes a sensor operably coupled to the detection element to generate a signal indicative of a plurality of parameters of the sliding camshaft. Each sensor is configured to generate a signal indicative of an axial position of the detection element relative to the base shaft. Each sensor is further configured to generate the signal indicative of at least one of an angular position of the base shaft about the longitudinal axis and an angular speed of the base shaft. The sliding camshaft further includes a controller electrically coupled to the sensors and configured to actuate a vehicle system in response to the sensor signal.

In one aspect, the base shaft is free of a camshaft angular position sensor and trigger wheel that are dedicated to measuring an angular position of the base shaft and separate from the sensor and the detection element.

In another aspect, the detection element includes first and second annular profiles that are formed on a camshaft barrel and are different from one another. The first annular profile is associated with the camshaft barrel being disposed in the first position, and the second annular profile is associated with the camshaft barrel being disposed in the second position.

In another aspect, the detection element is further axially movable to a third position relative to the base shaft, and the detection element includes a third annular profile that is formed on the camshaft barrel and is different from the first and second annular profiles. The third annular profile is associated with the base shaft being disposed in the third position.

In another aspect, the detection element is further axially movable to a third position relative to the base shaft, and the camshaft barrel includes a third annular profile that is different from the first and second annular profiles. The third annular profile is associated with the base shaft being disposed in the third position.

In another aspect, the first, second, and third annular profiles each form an arrangement of surface elevations about the longitudinal axis.

In another aspect, the sensor is positioned to scan the first annular profile of the camshaft barrel when the detection element is axially disposed in the first position and the base shaft rotates about the longitudinal axis, such that the sensor generates a first signal. The first signal is indicative of the angular position of the base shaft, the angular speed of the base shaft, and the first position of the camshaft barrel.

In another aspect, the sensor is positioned to scan the second annular profile of the camshaft barrel when the detection element is axially disposed in the second position and the base shaft rotates about the longitudinal axis, such that the sensor generates a second signal. The second signal is different from the first signal and indicative of the angular position of the base shaft, the angular speed of the base shaft, and the first position of the camshaft barrel.

According to several aspects, a method for sensing camshaft barrel position of a sliding camshaft includes rotating at least one sliding camshaft having at least one camshaft barrel. The method further includes activating at least one actuator for engaging at least one position shifting slot in the at least one camshaft barrel to axially move the camshaft barrel along the sliding camshaft. The method further includes using at least one sensor to detect the axial position, an angular position, and an angular speed of the camshaft barrel.

In one aspect, the step of detecting includes tracking at least annular profile of the at least one camshaft barrel that is indicative of at least one of a first, a second, or third position of the camshaft barrel.

In another aspect, the step of detecting includes using an optical sensor, an inductive sensor, a Hall effect sensor, or a magnetoresistive sensor for tracking the axial position of the camshaft barrel.

BRIEF DESCRIPTION OF THE DRAWINGS

The present exemplary embodiment will hereinafter be described in conjunction with the following drawing figures, wherein like numerals denote like elements.

DETAILED DESCRIPTION

The following description is merely exemplary in nature and is not intended to limit the present disclosure, application, or uses.

Figure 1:
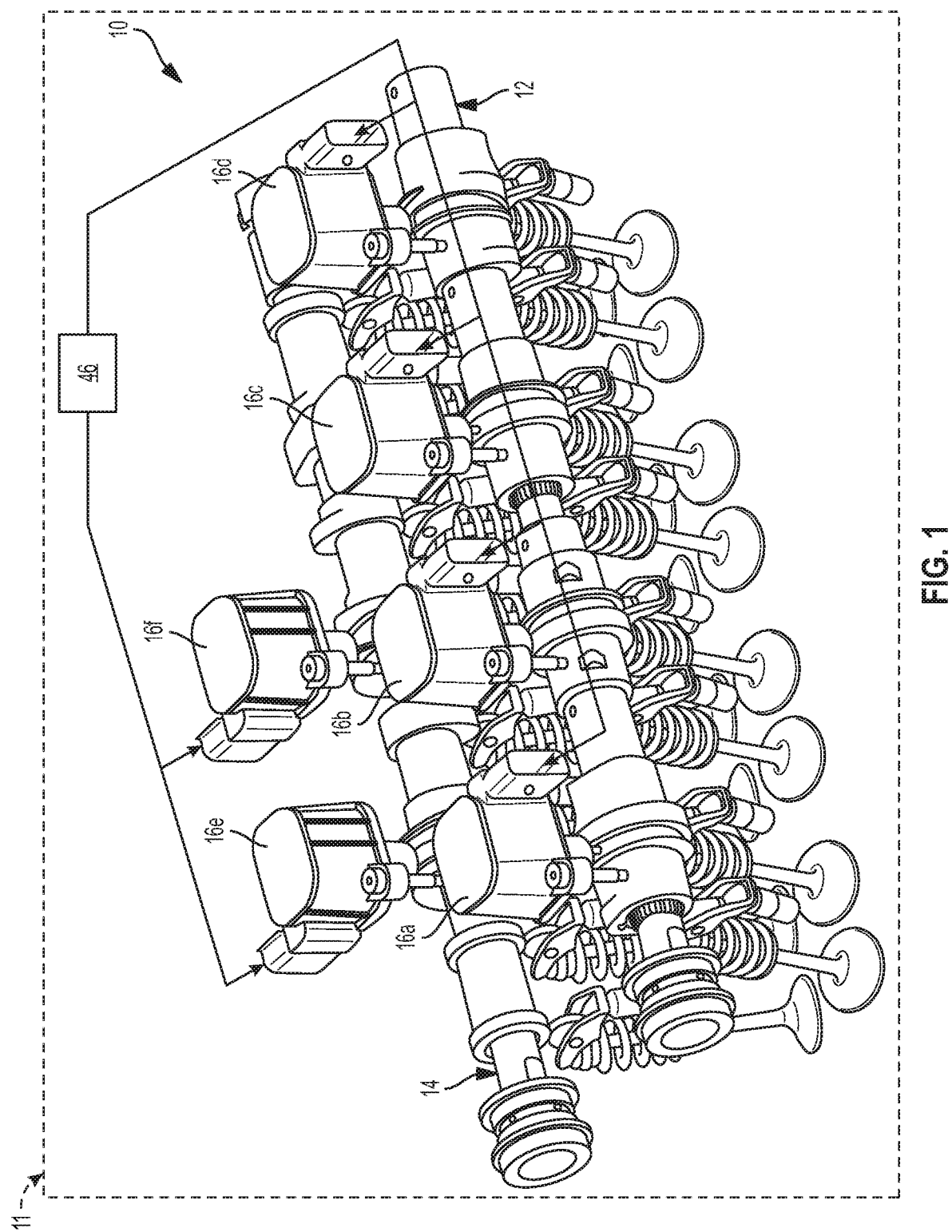
FIG. 1 is an illustration of one embodiment of a variable valve actuation system having an intake sliding camshaft and an exhaust sliding camshaft for an internal combustion engine.

Referring to FIG. 1, there is illustrated a variable valve actuation system ("WA system") 10 for an internal combustion engine 11 of a motor vehicle, with the WA system having lobe banks each with first, second, and third cam profiles of any suitable shapes that are different from one another for actuating valves in associated manners. The lobe banks are axially movable such that one of the cam profiles actuates the associated valve. The WA system 10 further includes a sensor assembly for identifying the cam profile currently operating a valve, the angular position of a camshaft, and the angular speed of the camshaft. In one example, as described in detail below, the VVA system can be a variable valve lift system 10 ("VVL system") for a four-cylinder, four-stroke gasoline engine 11 of a motor vehicle. The VVL system 10 includes first, second, and third cam profiles in the form of a symmetrical high-lift cam for lifting a valve a first height to improve vehicle performance under high load conditions, a symmetrical low-lift cam for lifting a valve a second height that is shorter than the first height under partial load conditions, and a deactivation profile that produces zero lift under idling conditions. However, it will be appreciated that the VVL system and the four-cylinder gasoline engine are merely exemplary, and the concept of a sensor assembly may be applied to any valve actuation system and any internal combustion engine.

The system 10 includes at least one sliding camshaft that, in this example, includes an intake sliding camshaft 12 and an exhaust sliding camshaft 14. The intake sliding camshaft 12 and the exhaust sliding camshaft 14 are similar to one another. In other embodiments, the system may have more or fewer than two sliding camshafts.

Figure 2:
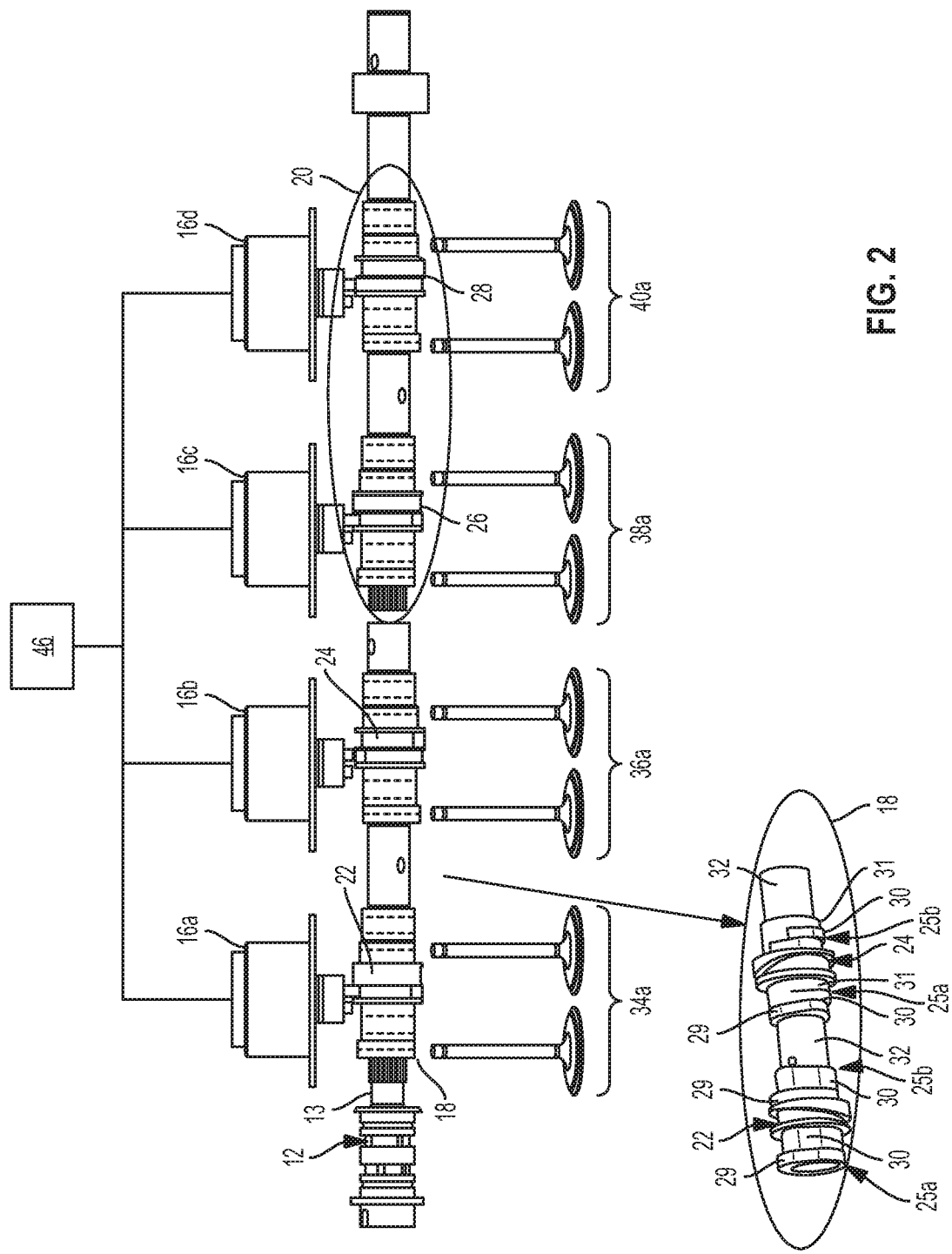
FIG. 2 is a side view of the intake sliding camshaft of FIG. 1, illustrating the intake sliding camshaft having an intake base shaft and two shuttle bodies.
Figure 5A:
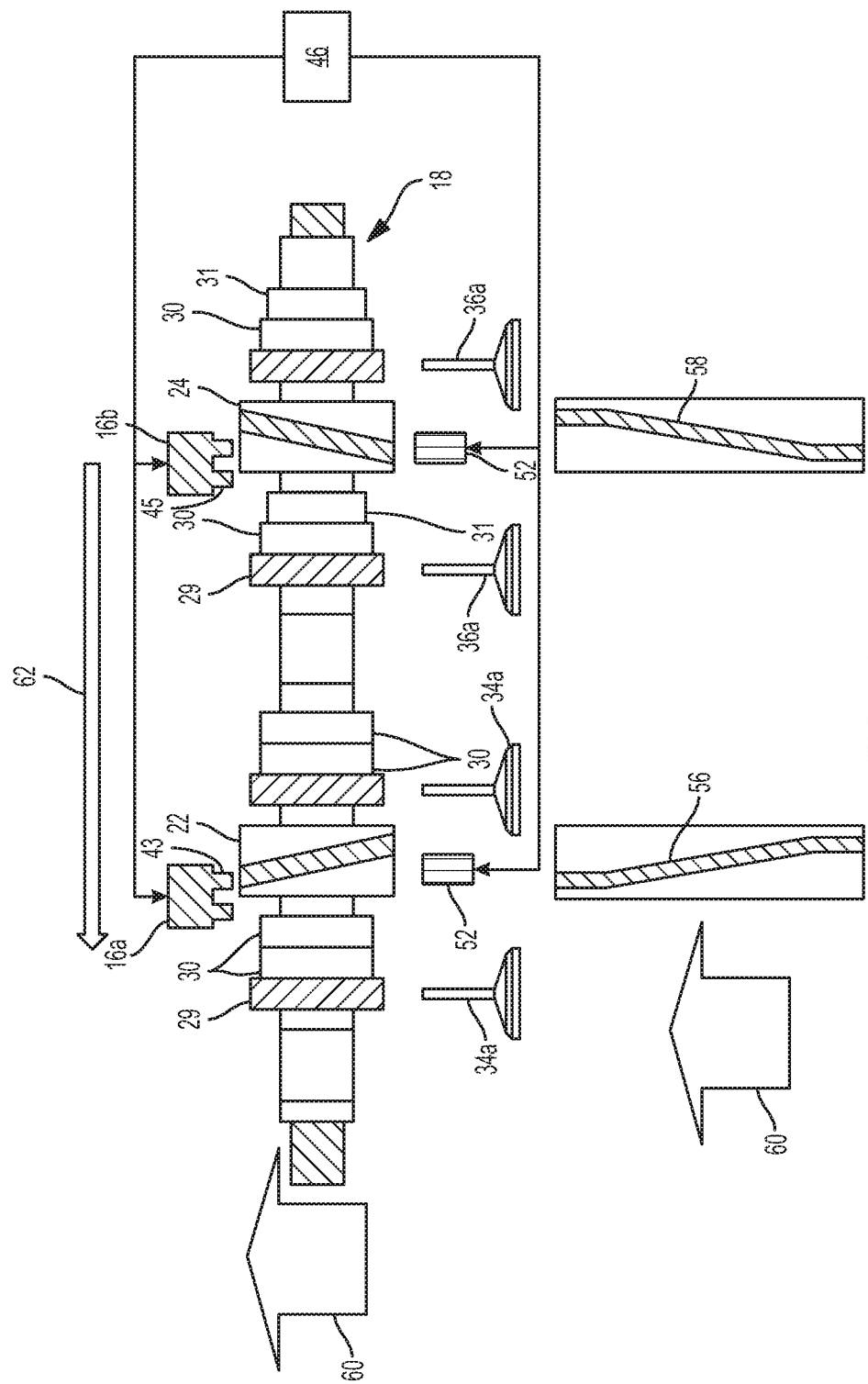
FIG. 5A is a schematic illustration of one of the lobes of the intake sliding camshaft of FIG. 2, illustrating the lobe axially disposed in a first position.
Figure 5B:
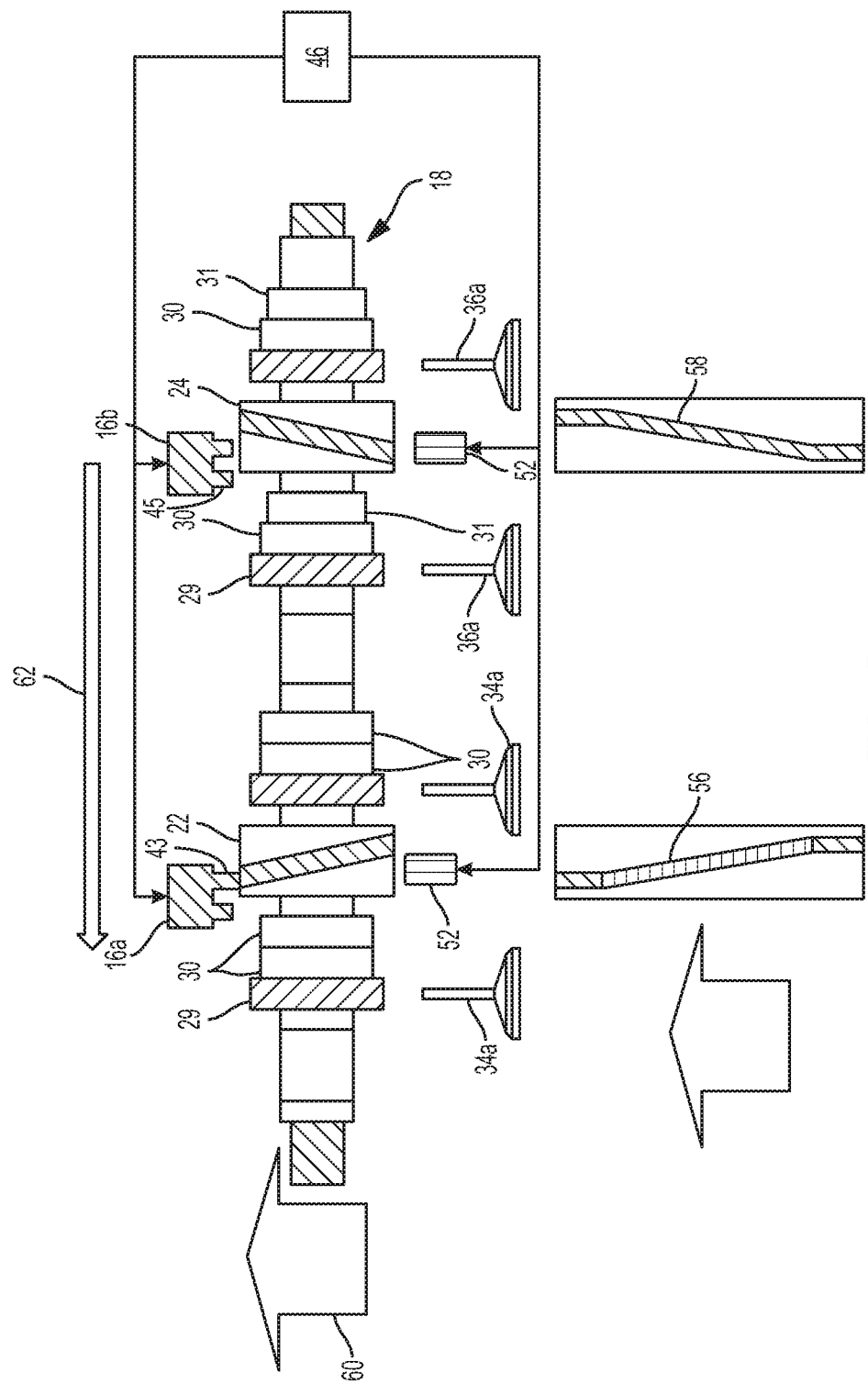
FIG. 5B is a schematic illustration of the lobe of FIG. 5A, illustrating the first actuator engaging the lobe to axially move the lobe in a first direction from the first position toward a second position.
Figure 5C:
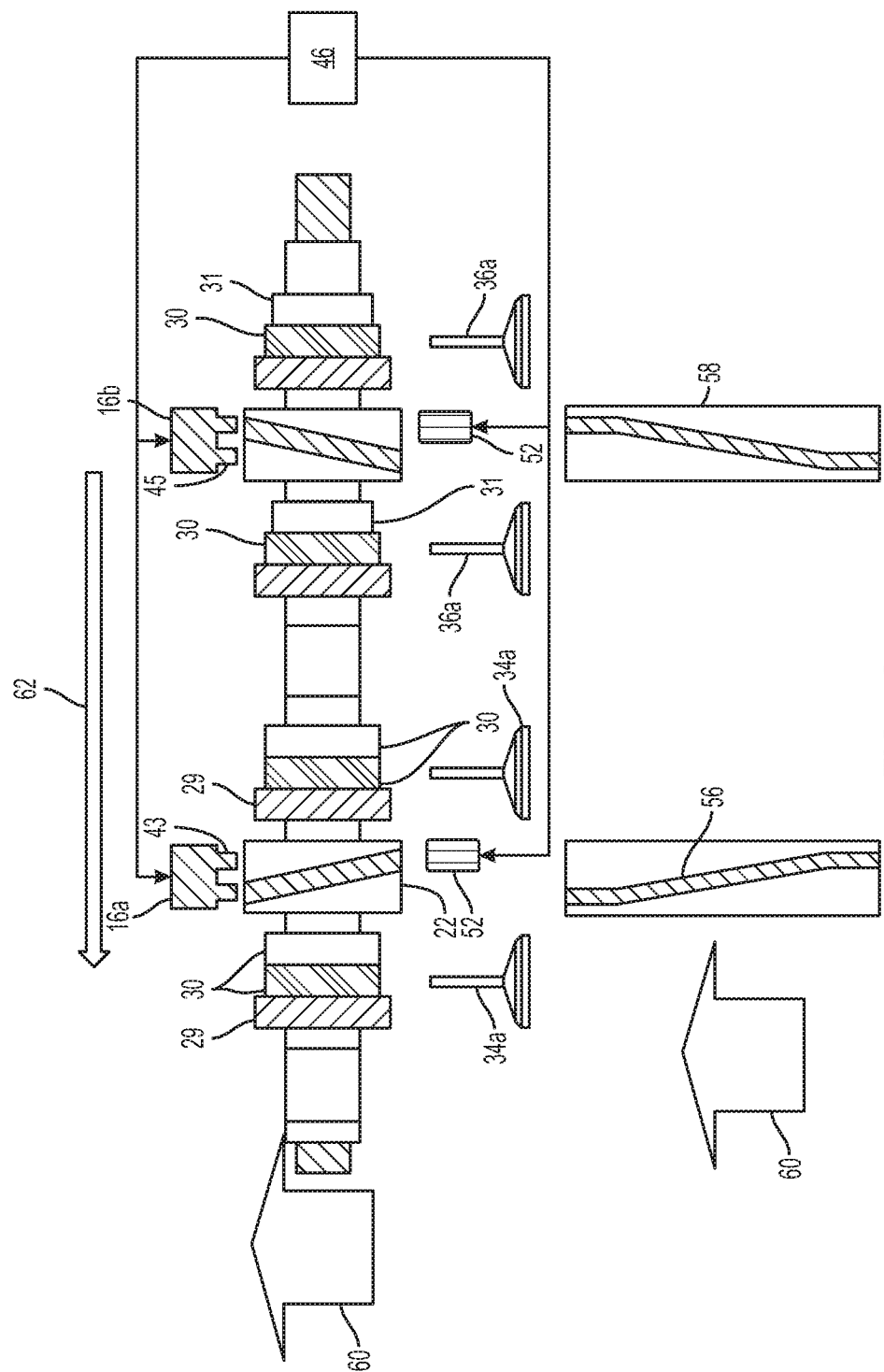
FIG. 5C is a schematic illustration of the lobe of FIG. 5B, illustrating the lobe axially disposed in the second position with the first actuator disengaged from the lobe.
Figure 5D:
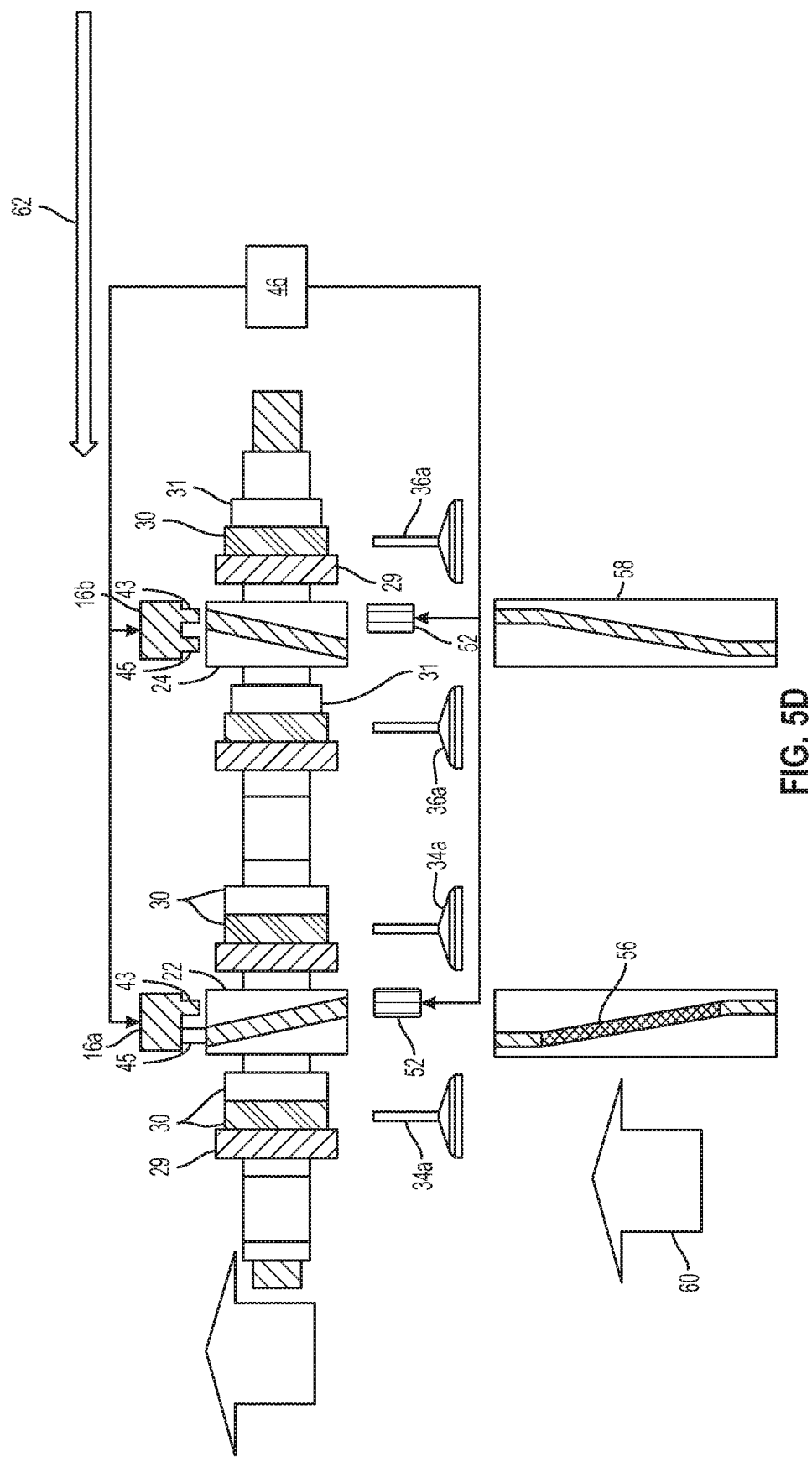
FIG. 5D is a schematic illustration of the lobe of FIG. 5C, illustrating the first actuator engaging the lobe to axially move the lobe in the first direction from the second position toward a third position.
Figure 5E:
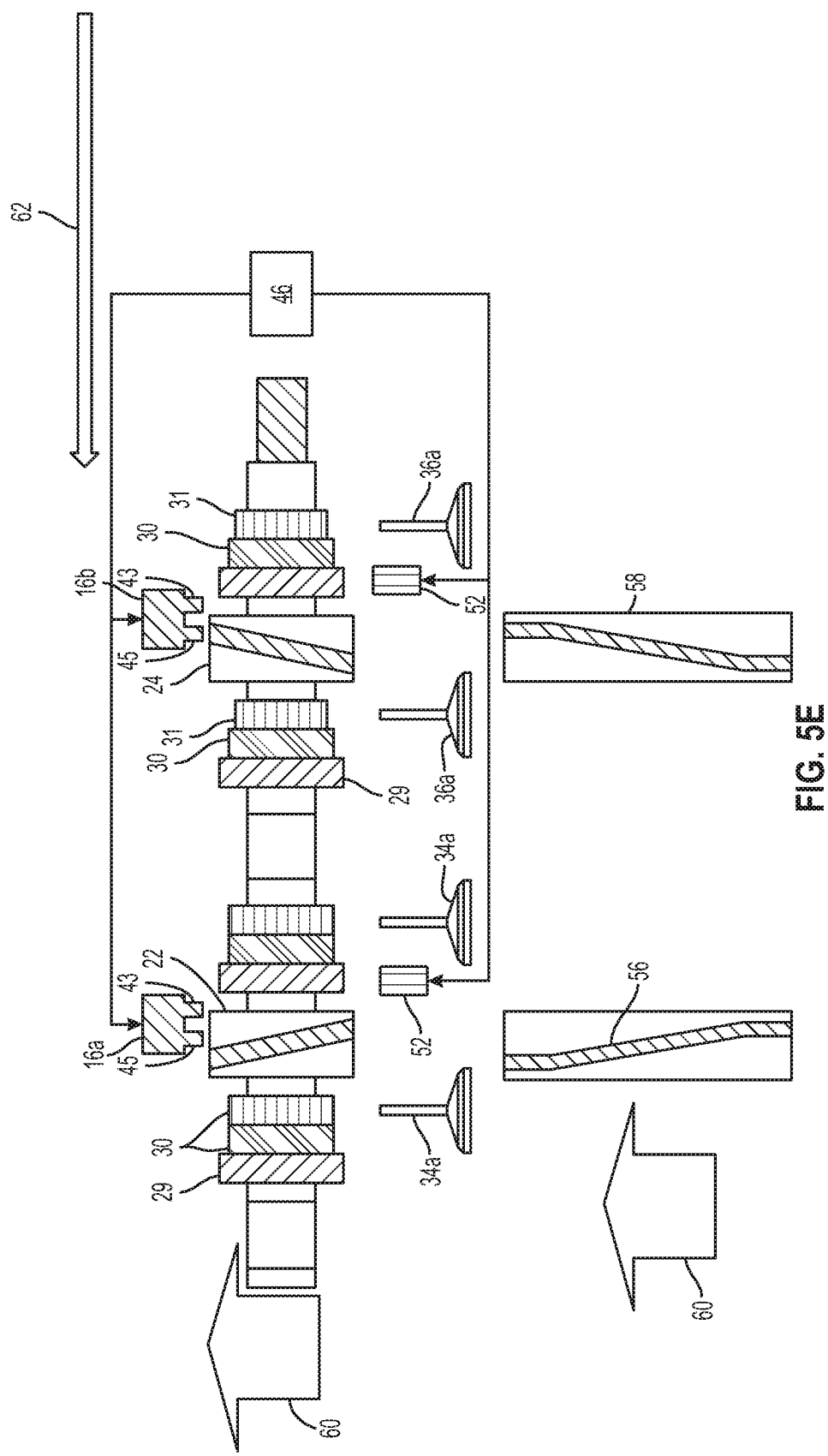
FIG. 5E is a schematic illustration of the lobe of FIG. 5D, illustrating the lobe axially disposed in the third position with the first actuator disengaged from the lobe.

Referring now to FIG. 2, the intake sliding camshaft 12 includes an intake base shaft 13 and two shuttle bodies 18, 20, which are rotationally fixed to the base shaft 13 and axially movable relative to the base shaft 13 between a first position (FIG. 5A), a second position (FIG. 5C), and a third position (FIG. 5E).

The shuttle body 18 includes two camshaft barrels 22, 24, and each camshaft barrel 22, 24 is associated with two lobe banks 25a, 25b mounted to the shuttle body 18. Each lobe bank 25a, 25b includes a first cam 29, a second cam 30, and a third cam 31. The first, second, and third cams 29, 30, 31 have associated cam profiles that are different from one another for actuating the valve 34a in associated ways different from the other. Each lobe bank can include cams with symmetrical cam profiles, asymmetrical cam profiles, common nose radius, different nose radiuses, cam profiles with a single nose, or cam profiles with multiple noses, such that each cam profile provides a lift, duration, acceleration, timing, or other valve parameter that is different from that produced by the other cam profiles in the lobe bank.

In this example, the first cam 29 can be a high-lift cam configured to move an associated one of the intake valves 34a, 36a, 38a, 40a a first distance between a maximum open position and a closed position in response to the shuttle body 18 being disposed in the first position and the intake sliding camshaft 10 rotating 360 degrees. The second cam 30 can be a low-lift cam configured to move the valve a second distance between a less than maximum open position and a closed position in response to the shuttle body 18 being disposed in the second position and the intake sliding camshaft 10 rotating 360 degrees. The first distance is longer than the second distance. The third cam 31 can be a reduced diameter portion that remains spaced from the valve and configured to not open the valve in response to the shuttle body 18 being disposed in the third position and the intake sliding camshaft 10 rotating 360 degrees.

Figure 3:
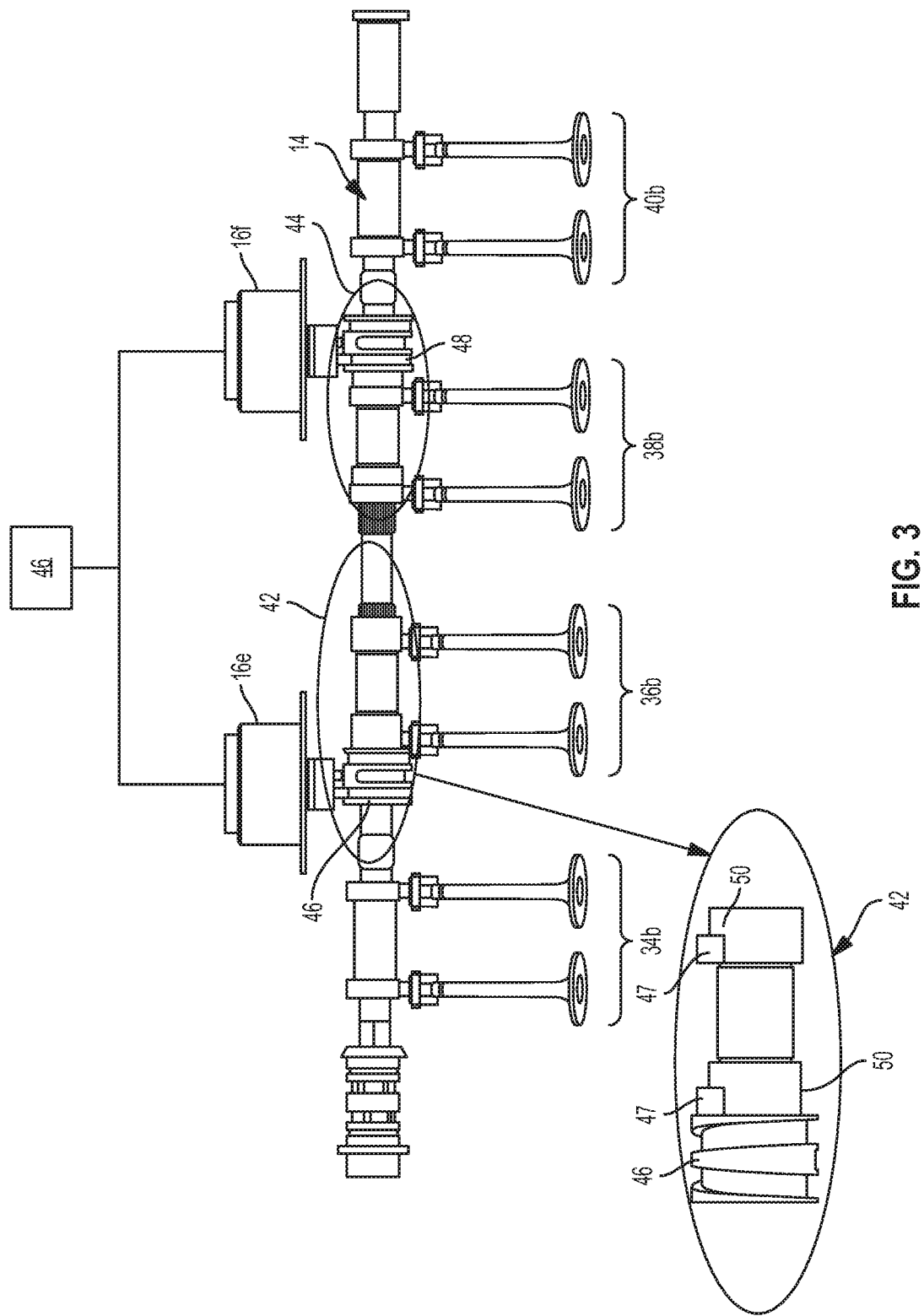
FIG. 3 is a side view of the exhaust sliding camshaft of FIG. 1, illustrating the exhaust sliding camshaft having an exhaust base shaft and two shuttle bodies.

Referring to FIG. 3, the exhaust sliding camshaft 14 has two shuttle bodies 42, 44 and is similar to the intake sliding camshaft 12 of FIG. 2 having two shuttle bodies 18, 20. However, while each of the shuttle bodies 18, 20 of FIG. 2 includes two camshaft barrels, each of the shuttle bodies 42, 44 includes one camshaft barrel. More specifically, in this example, the shuttle bodies 42 include an associated one of camshaft barrels 46, 48. In addition, the shuttle body 42 has only two cams, including a first cam 47 configured to lift the associated valve to a maximum open position and a second cam having a reduced outer diameter configured to not open the valve at all. In this non-limiting example, the exhaust sliding camshaft has dedicated cams that continuously actuate valves 34b, 40b for opening those valves only to a maximum open position. It is contemplated that the exhaust sliding camshaft and the intake sliding camshaft can have any number of cams for actuating an associated valve.

As described in detail below, FIGS. 5A-5E illustrate operation of the VVL system for moving the intake camshaft 12 from the first position to the third position. FIGS. 6A-6D illustrate operation of the VVL system for returning the intake camshaft 12 from the third position to the first position.

The VVL system 10 includes a plurality of actuators 16a-16d attached to a cover 54 (FIG. 4) and configured to cooperate with the intake shaft 10 to shift the position of the intake shaft between the first position and the third position. More specifically, the intake sliding camshaft 12 includes camshaft barrels 22, 24 configured to engage the actuators to move the shuttle body between the first position, the second position, and the third position. The camshaft barrels 22, 24 are mounted to the associated shuttle body, and each camshaft barrel 22, 24 forms associated position shifting slots 56, 58 configured to engage a first pin 43 of the corresponding actuator for axially moving the associated shuttle body 18 in a first direction 62 along the longitudinal axis and a second pin 45 of the corresponding actuator for axially moving the associated shuttle body in a second direction 64 along the longitudinal axis in response to a command signal from the ECU 46. The other camshaft barrels have the same position shifting slots that are engaged by the associated actuators in response to a command from the ECU 46.

Referring to FIGS. 5A-5E and 7A-7C, the VVL system 10 further includes one or more sensor assemblies 51 associated with the shuttle bodies 18, 20. Each sensor assembly includes a detection element 68 mounted to the shuttle body 18 (FIGS. 5A-5E). Continuing with the previous example, the intake sliding camshaft 12 includes two sensor assemblies 51. Each detection element 68 includes first, second, and third annular profiles 70, 72, 74 formed on each of the camshaft barrels 22, 24, with the first, second, and third annular profiles 70, 72, 74 being different from one another. As will be described in more detail below, the first, second, and third annular profiles 70, 72, 74 correspond with the camshaft barrel 22 being disposed in an associated one of the first position (FIGS. 5A and 7A), the second position (FIGS. 5C and 7B), and the third position (FIGS. 5E and 7C) relative to the base shaft.

Figure 4:
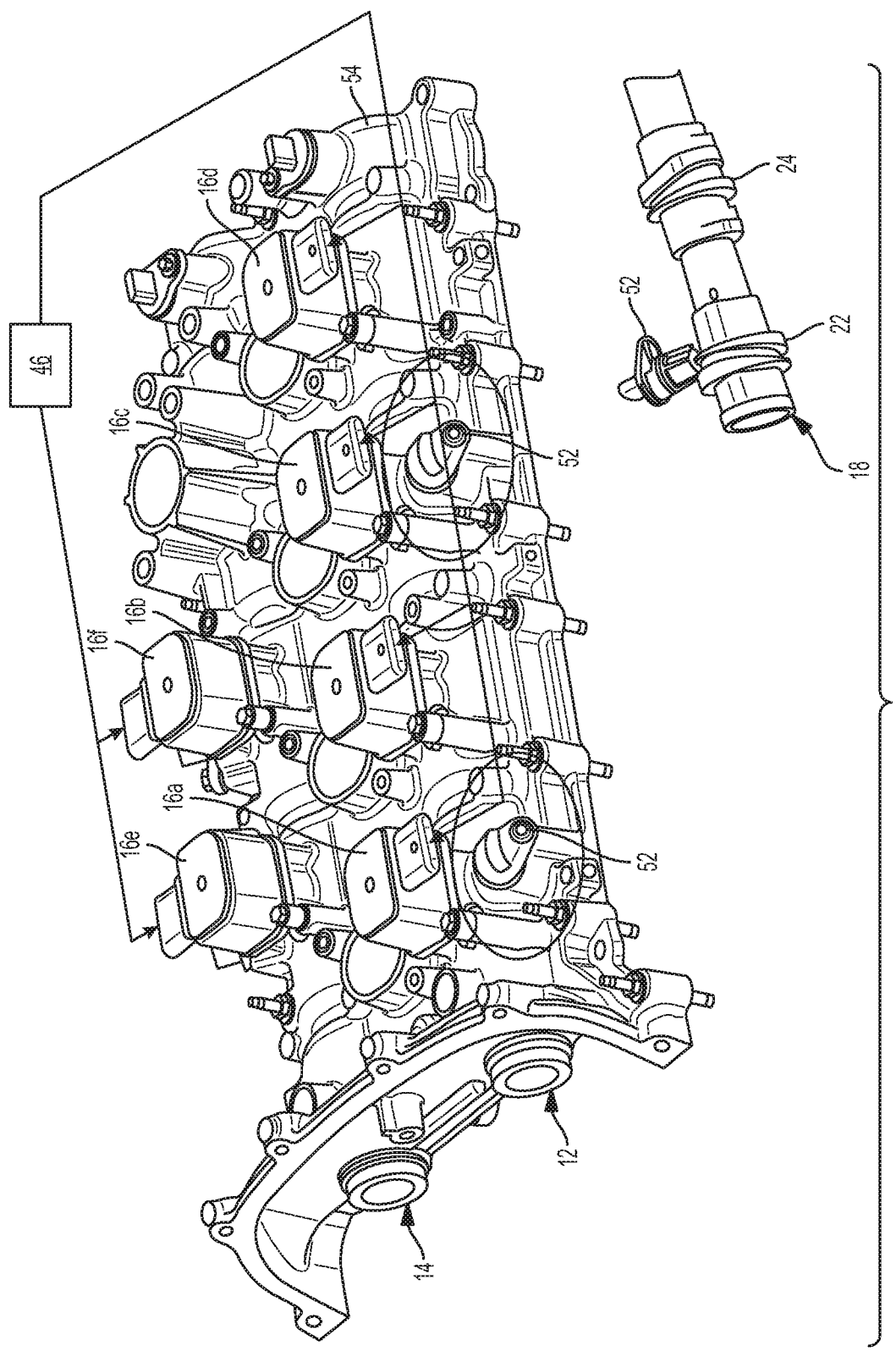
FIG. 4 is a perspective view of a sliding camshaft cover of the variable valve actuation system of FIG. 1.
Figure 7A:
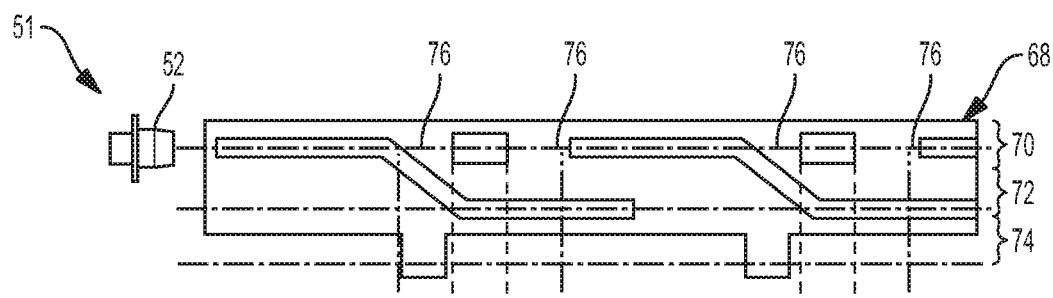
FIG. 7A is a schematic view of a sensor assembly including a sensor and a detection element having a first annular profile with surface elevations formed on a camshaft barrel of the intake sliding camshaft, with the detection element disposed in the first position to align the sensor with the first annular profile.
Figure 7B:
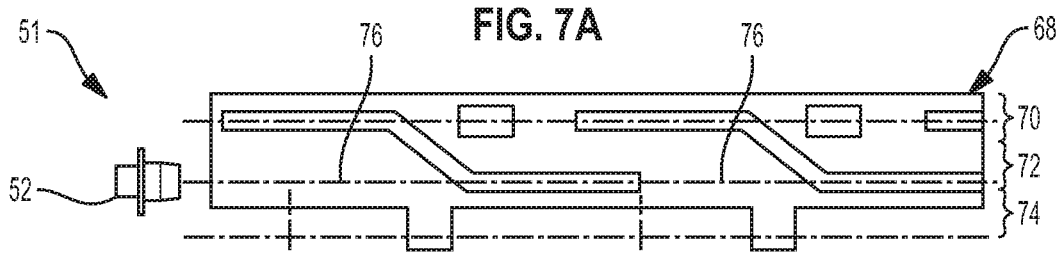
FIG. 7B is a schematic view of the sensor assembly of FIG. 7A, illustrating the detection element further having a second annular profile with surface elevations formed on the camshaft barrel, with the detection element disposed in the second position to align the sensor with the second annular profile.
Figure 7C:
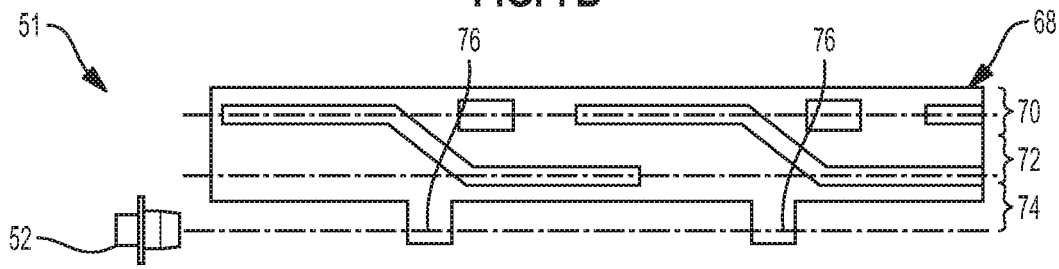
FIG. 7C is a schematic view of the sensor assembly of FIG. 7B, illustrating the detection element further having a third annular profile with surface elevations formed on the camshaft barrel, with the detection element being disposed in the third position to align the sensor with the third annular profile.

Referring to FIGS. 7A-7C, the first, second, and third annular profiles 70, 72, 74 each provide an arrangement of surface elevations 76 about the longitudinal axis. The arrangement of surface elevations 76 for the annular profiles are different from one another in length about the peripheral surface of the camshaft barrel 22, 24. Each annular profile can include recesses, channels, grooves, or other omissions of material, and as described in detail below a sensor disposed above an omission of material may generate a signal that is weaker than a signal generated by the same sensor disposed adjacent to a surface elevation. It is contemplated that the intake sliding shaft can include more or fewer than two sensor assemblies with each having more than one detection element Referring to FIGS. 7A-7C, each sensor assembly 51 further includes a sensor 52 attached to the cover 54 (FIG. 4). The sensor 52 is operably coupled to the detection element 68 and configured to scan the detection element 68 and measure multiple parameters of the sliding camshaft 12. More specifically, the sensor 52 is positioned adjacent to the camshaft barrel 22 and configured to generate a signal when a surface elevation 76 of the associated profile is disposed adjacent to the sensor. The sensor can be an optical sensor, an inductive sensor, a Hall effect sensor, or a magnetoresistive sensor. However, it is contemplated that the sliding camshaft can include any number of suitable sensors.

Figure 8A:
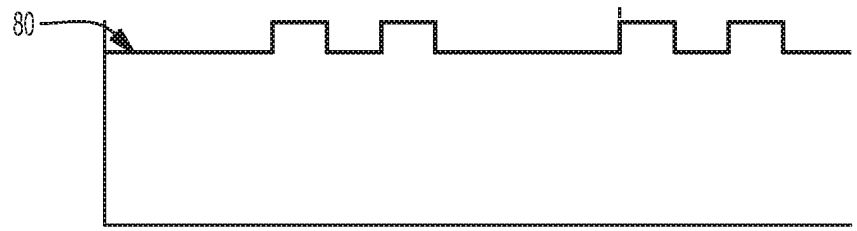
FIG. 8A is a graph of a first signal produced by the sensor in response to scanning the surface elevations within the first annular profile of FIG. 7A.

Referring to FIG. 7A, the sensor 52 is configured to scan the first annular profile 70 of the camshaft barrel 22 when the detection element 68 is axially disposed in the first position and the base shaft rotates about the longitudinal axis, such that the sensor 52 generates a first signal 80 (FIG. 8A). The first signal 80 is indicative of the angular position of the base shaft 13, the angular speed of the base shaft 13, and the first axial position of the detection element 68 relative to the base shaft.

Figure 8B:
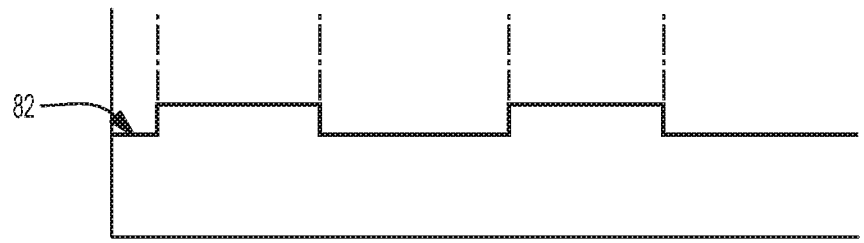
FIG. 8B is a graph of a second signal produced by the sensor in response to scanning the surface elevations within the second annular profile of FIG. 7B.

Referring to FIG. 7B, the sensor 52 is configured to scan the second annular profile 72 of the camshaft barrel 22 when the detection element 68 is axially disposed in the second position and the base shaft rotates about the longitudinal axis, such that the sensor 52 generates a second signal 82 (FIG. 8B). The second signal 82 is indicative of the angular position of the base shaft, the angular speed of the base shaft, and the second axial position of the camshaft barrel 22 relative to the base shaft. The surface elevations for the second annular profile 72 are arranged such that the second signal 82 is different from the first signal 80.

Figure 8C:
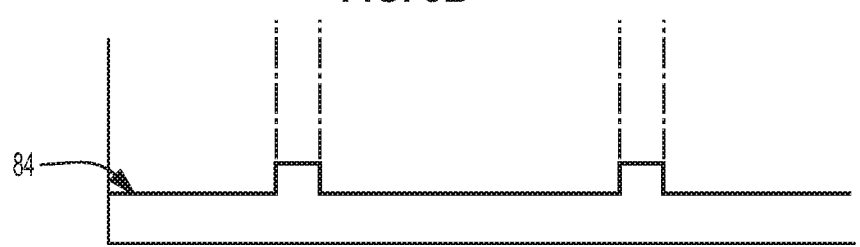
FIG. 8C is a graph of a third signal produced by the sensor in response to scanning the surface elevations within the second annular profile of FIG. 7C.

Referring to FIG. 7C, the sensor 52 is configured to scan the third annular profile 74 of the camshaft barrel 22 when the detection element 68 is axially disposed in the third position and the base shaft rotates about the longitudinal axis, such that the sensor 52 generates a third signal 84 (FIG. 8C). The third signal 84 is indicative of the angular position of the base shaft, the angular speed of the base shaft, and the third position of the camshaft barrel 22. The surface elevations 76 for the third annular profile 74 are arranged such that the third signal 84 that is different from the first and second signals 80, 82.

It is contemplated that each annular profile can have other suitable surface elevations, such that the sensor can produce other signals that are still different from one another. Based on the unique signal for each axial position of the camshaft barrel, the ECU 46 can determine whether the shuttle body 18 is disposed in the first position, the second position, or the third position. Furthermore, based on for example the respective frequencies of the signals, the ECU can determine the angular speed and angular position of the camshaft. Because the sensor determines the angular position of the base shaft 13 and several other parameters of the intake sliding camshaft 12, the camshaft is free of an angular position sensor, e.g. trigger wheel, that is dedicated to measuring only an angular position and is separate from the sensors 52 and the detection elements 68.

Referring now to FIG. 4, an illustration of a sliding camshaft cover 54 upon which the position actuators 16a-16f and sensors 52 are mounted. The sliding camshaft cover 54 shrouds the intake and exhaust sliding camshafts 12, 14 as protection from the outside environment containments and retain oil splatter produced by the operation of the engine. The sensors 52 are disposed in the sliding camshaft cover 54 proximate to at least one position shifting slot such that the position of at least one camshaft barrel, e.g., camshaft barrel 22, 24, can be detected by the sensors 52. The sensors 52 may be of the type that are used for position detection suitable for an engine environment including, but not limited to, a Hall Effect sensor.

In operation, the ECU 46 is electrically coupled to the sensors 52 and the actuators 16a-16f and configured to actuate a vehicle system in response to the sensor signal received from the sensors 52. As shown in FIG. 5A, there is shown an enlarged view of the shuttle body 18 of the intake sliding camshaft 12 disposed in the first position with the high-lift cams 29 positioned to move the valves 34a, 36a. As the intake sliding camshaft 12 rotates towards direction 60, the actuator 16a may be commanded to engage one or more of the position shifting slots 56, 58 to cause the shuttle body 18 of the intake sliding camshaft 12 to shift along the camshaft axis in direction 62. The sensor 52 continuously detects the position of the camshaft barrel 22, 24 and communicates the position to the ECU 46. In particular, the sensors 52 now detect distinct features on the camshaft barrel 22, 24 indicative of the first position, the angular position of the intake base shaft, and the angular speed of the same, and the sensor 52 transmits an associated signal to the ECU 46.

Referring now to FIGS. 5B and 5C, when the actuator 16a engages the position shifting slot 56, the shuttle body 18 shifts along the camshaft axis in the direction 62 such that the intake valves 34a, 36b transition from being moved by the high-lift cams 29 to being moved by the low-lift cams 30. In addition, the sensors 52 now detect distinct features on the camshaft barrel 22, 24 indicative of the second position the angular position of the intake base shaft, and the angular speed of the same, and the sensor 52 transmits an associated signal to the ECU 46.

Referring now to FIGS. 5D and 5E, when the actuator 16a is commanded to engage the position shifting slot 56 again, the shuttle body 18 is caused to shift along the camshaft axis in the direction 62 such that the intake valves 34a, 36a transition from the second position to the third position. In addition, the sensors 52 now detect distinct features on the camshaft barrel 22, 24 indicative of the third position 31, the angular position of the intake base shaft, and the angular speed of the same, and the sensor 52 transmits an associated signal to the ECU 46.

Figure 6A:
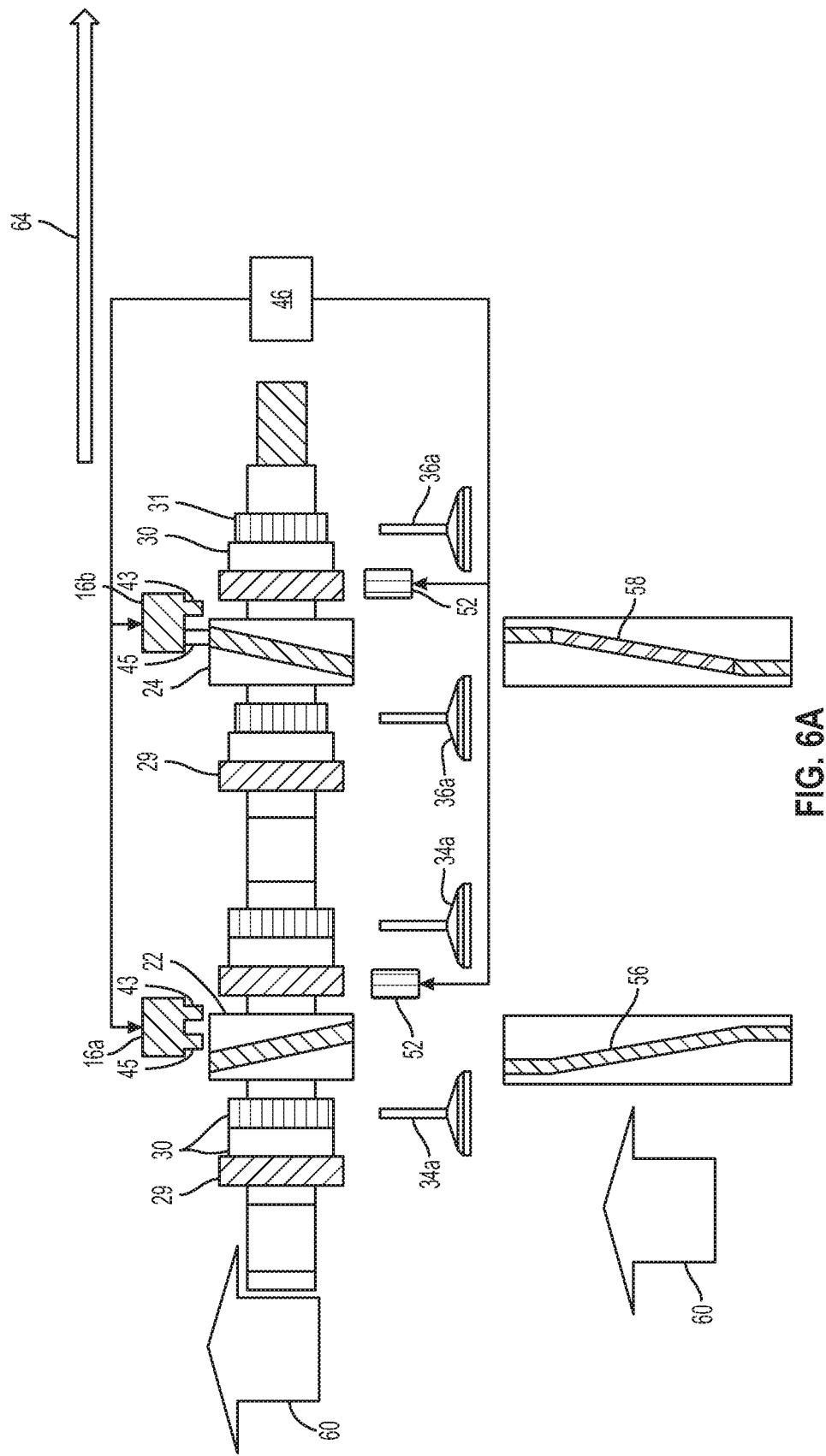
FIG. 6A is a schematic illustration of the lobe of FIG. 5E, illustrating a second actuator engaging the lobe to axially move the lobe in a second direction from the third position toward the second position, where the second direction is opposite to the first direction.
Figure 6B:
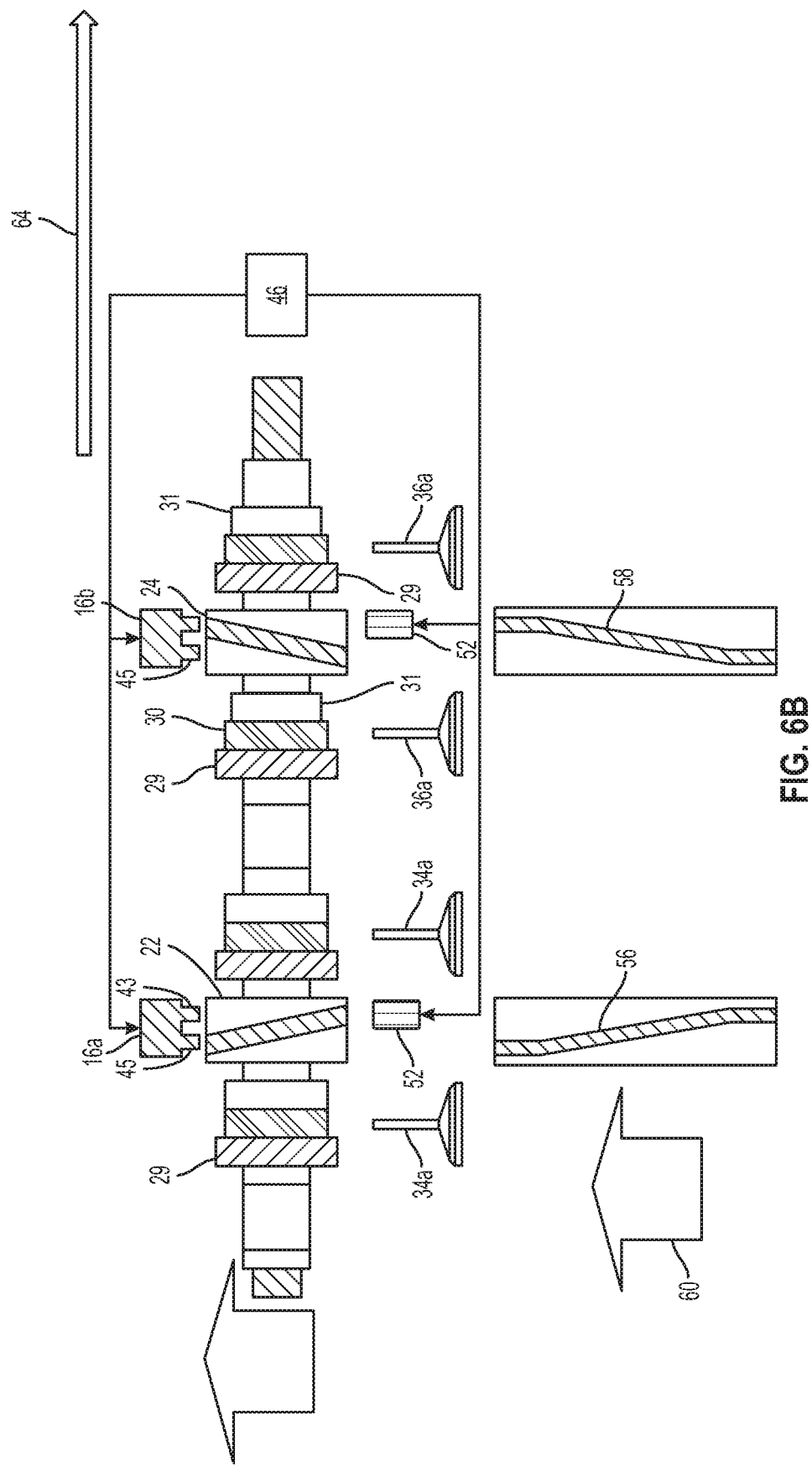
FIG. 6B is a schematic illustration of the lobe of FIG. 6A, illustrating the lobe axially disposed in the second position with the second actuator disengaged from the lobe.

Referring to FIGS. 6A and 6B, when the actuator 16b is commanded to engage the position shifting slot 58, the shuttle body 18 is caused to shift along the camshaft axis in the opposite direction 62 such that the intake valves 64 transition from the third position 31 to the second position 30. In addition, the sensors 52 detect distinct features on the camshaft barrel 22, 24 indicative of the second position 30, the angular position of the intake base shaft, and the angular speed of the same, and the sensor 52 transmits an associated signal to the ECU 46.

Figure 6C:
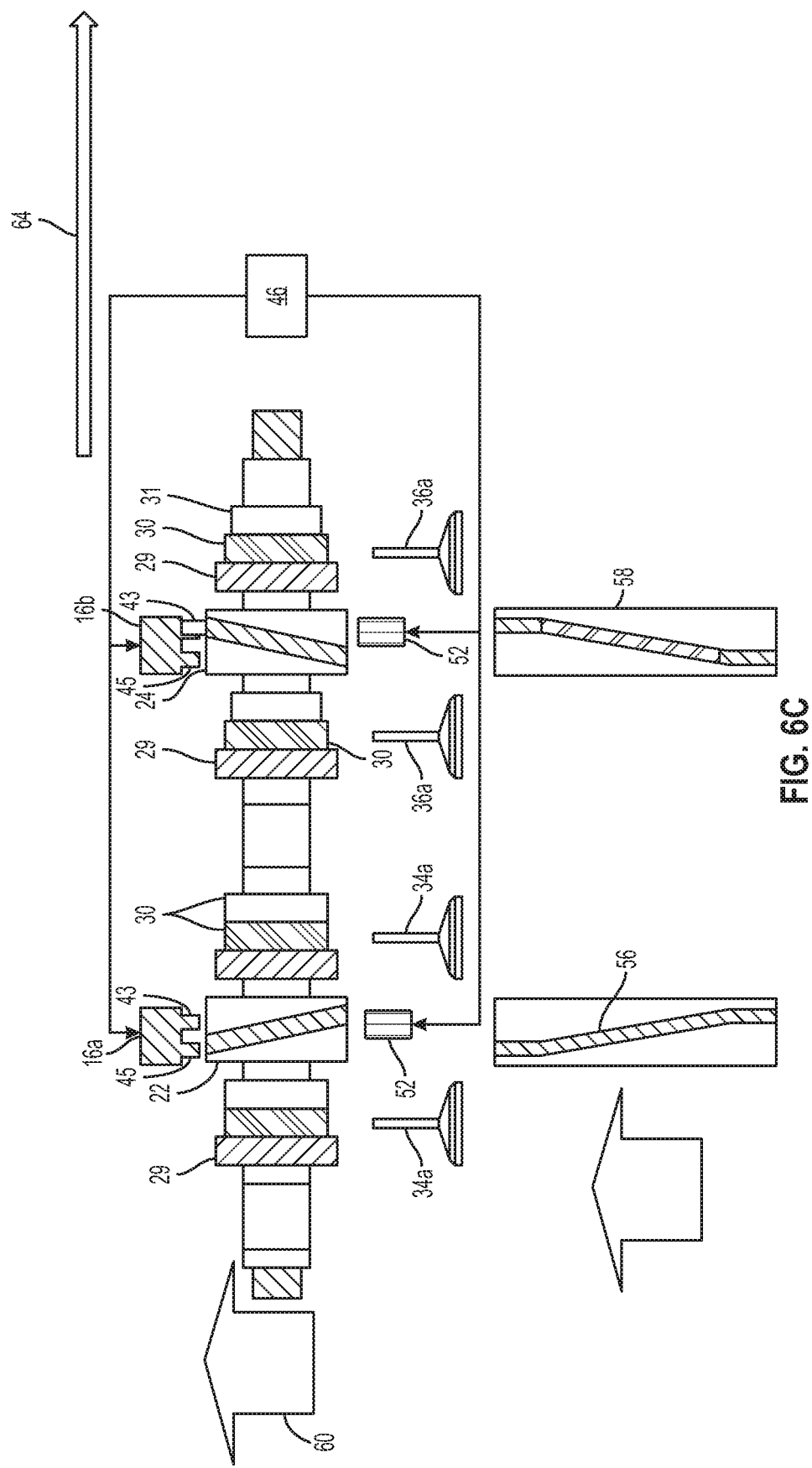
FIG. 6C is a schematic illustration of the lobe of FIG. 6B, illustrating the second actuator engaging the lobe to axially move the lobe in the second direction from the second position to the first position.
Figure 6D:
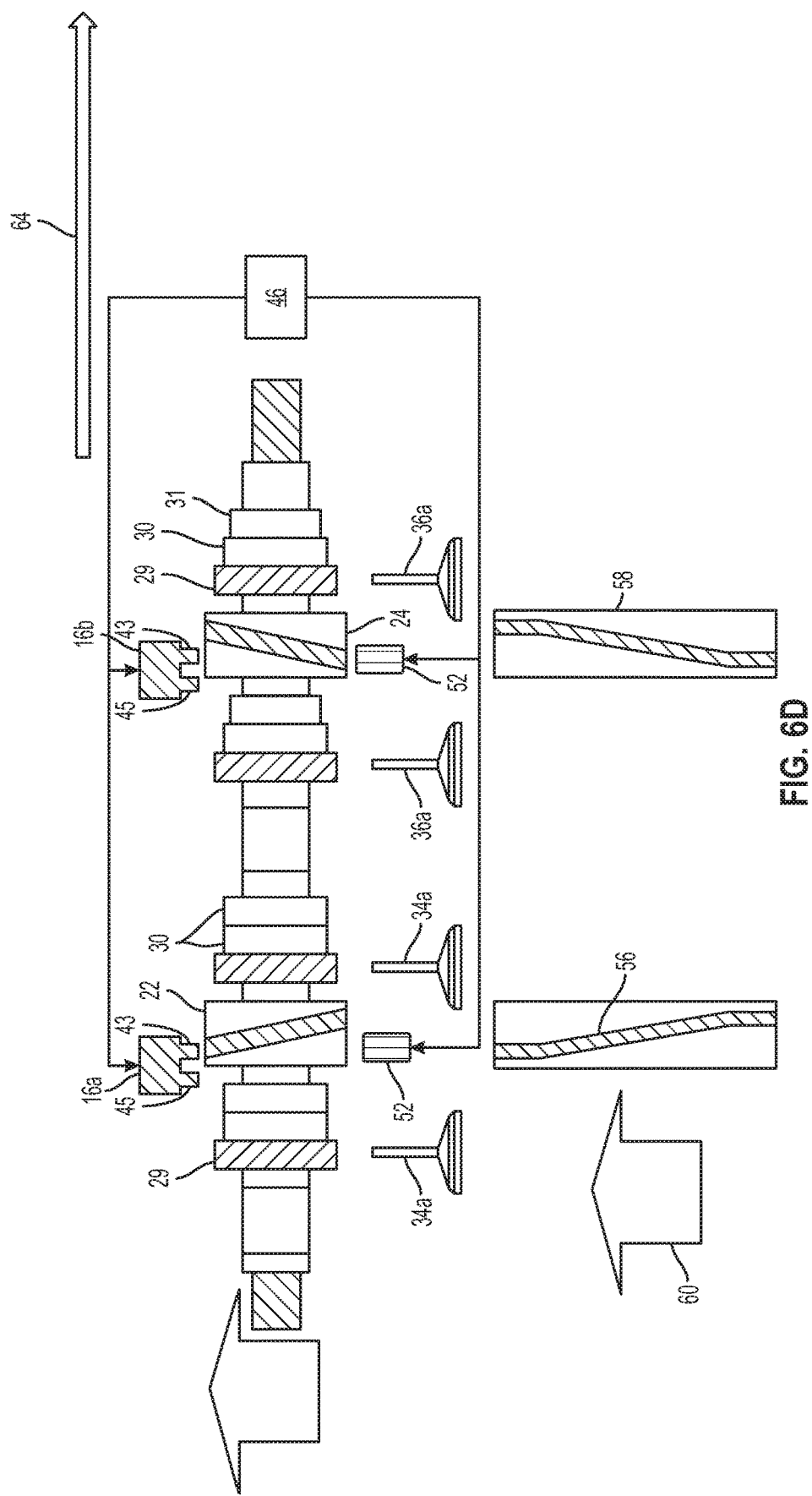
FIG. 6D is a schematic illustration of the lobe of FIG. 6C, illustrating the lobe returned to the first position with the second actuator disengaged from the lobe.

Referring now to FIGS. 6C and 6D, when the actuator 16b is again commanded to engage the position shifting slot 58, the shuttle body 18 is caused to shift along the camshaft axis in the opposite direction 62 such that the intake valves 64 transition from the second position 30 to the first position 29. Additionally, the sensors 52 now detect distinct features on the camshaft barrel 22, 24 indicative of the first position 29, the angular position of the intake base shaft, and the angular speed of the same, and the sensors 52 transmit an associated signal to the ECU 46. It is appreciated that the shuttle bodies of the intake and exhaust sliding camshafts 12, 14 are shifted into the various positions in a manner consistent with the shifting of shuttle body 18.

Figure 9:
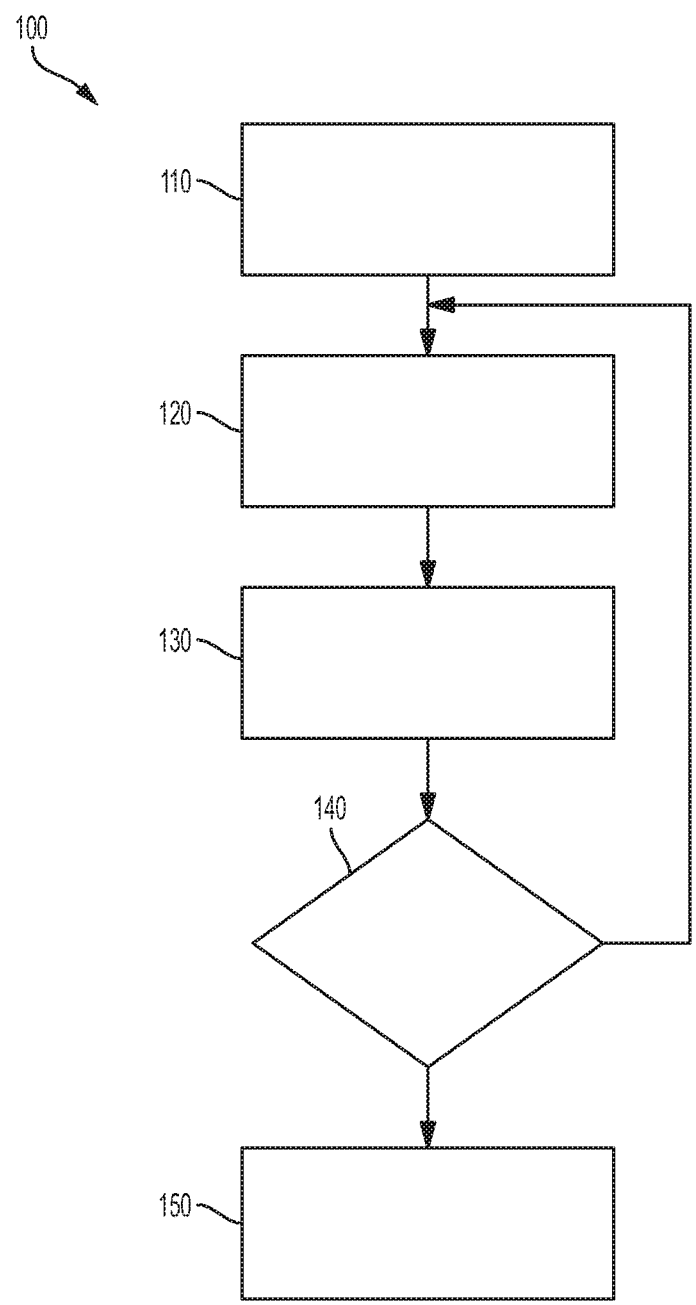
FIG. 9 is a flow chart of a method for using a sensor assembly to detect the axial position, angular position, and angular speed of a camshaft barrel for the sliding camshaft of the variable valve actuation system of FIG. 1.

Referring now to FIG. 9, an illustration of a method 100 for using the WA system 10 of FIG. 1 is provided. At step 110, the process begins with rotating at least one sliding camshaft 12, 14 having at least one camshaft barrel 22, 24 and detecting the current position of the camshaft barrel.

At step 120, the process continues with activating at least one actuator 16a-16f for engaging at least one position shifting slot in the at least one camshaft barrel to position of the at least one camshaft barrel.

At step 130, the method continues with at least one sensor 52 detecting the shifted axial position, the angular position, and the angular speed of the camshaft barrel. More specifically, the sensor 52 may detect the angular position and/or the angular speed of the crankshaft only during engine cranking or start, such that the ECU 46 can identify the crankshaft position and determine if the cylinder is disposed in the compression stroke or exhaust stroke. It is contemplated that the sensor 52 may detect the angular position and/or the angular speed in response to the ECU determining that the crankshaft sensor is malfunctioning. In accordance with the exemplary embodiment, a Hall Effect sensor is used for detecting the axial position of the at least one camshaft.

At step 140, the method continues with the ECU 46 determining if the camshaft barrel 22, 24 shifted position as commanded. If the ECU determines that the camshaft barrel 22, 24 shifted position as commanded, then the method returns to step 120.

At step 150, the ECU 46 actuates a vehicle system in response to a signal received from the sensor and indicative of the shifted axial position, the angular position, and the angular speed of the camshaft barrel.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A sensor assembly for a sliding camshaft of a motor vehicle, the sliding camshaft having a base shaft that extends along a longitudinal axis and is rotatable about the longitudinal axis, the sliding camshaft further includes a plurality of lobe banks mounted to the base shaft, with each lobe bank including a first cam and a second cam, the sensor assembly comprising:
   a detection element rotationally fixed relative to the base shaft and axially movable between first and second positions relative to the base shaft; and
   a sensor operably coupled to the detection element wherein the sensor is configured to generate a signal indicative of:
      an axial position of the detection element relative to the base shaft; and
      at least one of an angular speed of the base shaft and an angular position of the base shaft about the longitudinal axis;
      wherein the detection element includes first and second annular profiles that are formed on a camshaft barrel and are different from one another, wherein the first annular profile is associated with the camshaft barrel being disposed in the first position, and the second annular profile is associated with the camshaft barrel being disposed in the second position.

2. The sensor assembly of claim 1 wherein the detection element is further axially movable to a third position relative to the base shaft, and the detection element includes a third annular profile that is formed on the camshaft barrel and is different from the first and second annular profiles, wherein the third annular profile is associated with the base shaft being disposed in the third position.

3. The sensor assembly of claim 2 wherein the first, second, and third annular profiles each form an arrangement of surface elevations about the longitudinal axis.

4. The sensor assembly of claim 3 wherein the sensor is positioned to scan the first annular profile of the camshaft barrel when the detection element is axially disposed in the first position and the base shaft rotates about the longitudinal axis, such that the sensor generates a first signal indicative of the angular position of the base shaft, the angular speed of the base shaft, and the first position of the camshaft barrel.

5. The sensor assembly of claim 4 wherein the sensor is positioned to scan the second annular profile of the camshaft barrel when the detection element is axially disposed in the second position and the base shaft rotates about the longitudinal axis, such that the sensor generates a second signal indicative of the angular position of the base shaft, the angular speed of the base shaft, and the second position of the camshaft barrel.

6. The sensor assembly of claim 5 wherein the sensor is positioned to scan the third annular profile of the camshaft barrel when the detection element is axially disposed in the third position and the base shaft rotates about the longitudinal axis, such that the sensor generates a third signal indicative of the angular position of the base shaft, the angular speed of the base shaft, and the third position of the camshaft barrel.

7. The sensor assembly of claim 6 wherein the first, second, and third signals are different from one another.

8. The sensor assembly of claim 6 wherein the sensor is one of an optical sensor, an inductive sensor, a Hall effect sensor, and a magnetoresistive sensor.

9. A sliding camshaft for a variable valve actuation system of a motor vehicle, the sliding camshaft comprising:
- a base shaft extending along a longitudinal axis and adapted to rotate about the longitudinal axis;
- a shuttle body rotationally fixed to the base shaft and axially movable relative to the base shaft between first and second positions;
- first and second lobe banks mounted to the shuttle body, each of the first and second lobe banks including a first cam having a first cam profile configured to move a valve when the shuttle body is moved to the first position, and each of the first and second lobe banks further including a second cam having a second cam profile configured to move the valve when the shuttle body is moved to the second position, with the first and second cam profiles being different from one another; and
- a sensor assembly comprising:
  - a detection element mounted to the shuttle body; and
  - a sensor operably coupled to the detection element to generate a signal indicative of a plurality of parameters of the sliding camshaft, with the parameters comprising:
    - an axial position of the detection element relative to the base shaft; and
    - at least one of an angular position of the base shaft about the longitudinal axis and an angular speed of the base shaft; and
  - a controller electrically coupled to the sensor and configured to actuate a vehicle system in response to the signal generated by the sensor.

10. The sliding camshaft of claim 9 wherein the base shaft is free of a camshaft angular position sensor and trigger wheel that are dedicated to measuring an angular position of the base shaft and separate from the sensor and the detection element.

11. The sliding camshaft of claim 10 wherein the detection element includes first and second annular profiles that are formed on a camshaft barrel and are different from one another, wherein the first annular profile is associated with the camshaft barrel being disposed in the first position, and the second annular profile is associated with the camshaft barrel being disposed in the second position.

12. The sliding camshaft of claim 11 wherein the detection element is further axially movable to a third position relative to the base shaft, and the detection element includes a third annular profile that is formed on the camshaft barrel and is different from the first and second annular profiles, wherein the third annular profile is associated with the base shaft being disposed in the third position.

13. The sliding camshaft of claim 12 wherein the detection element is further axially movable to a third position relative to the base shaft, and the camshaft barrel includes a third annular profile that is different from the first and second annular profiles, wherein the third annular profile is associated with the base shaft being disposed in the third position.

14. The sliding camshaft of claim 13 wherein the first, second, and third annular profiles each form an arrangement of surface elevations about the longitudinal axis.

15. The sliding camshaft of claim 14 wherein the sensor is positioned to scan the first annular profile of the camshaft barrel when the detection element is axially disposed in the first position and the base shaft rotates about the longitudinal axis, such that the sensor generates a first signal, with the first signal being indicative of the angular position of the base shaft, the angular speed of the base shaft, and the first position of the camshaft barrel.

16. The sliding camshaft of claim 15 wherein the sensor is positioned to scan the second annular profile of the camshaft barrel when the detection element is axially disposed in the second position and the base shaft rotates about the longitudinal axis, such that the sensor generates a second signal, with the second signal being different from the first signal and indicative of the angular position of the base shaft, the angular speed of the base shaft, and the second position of the camshaft barrel.

17. A method for sensing camshaft barrel position of a sliding camshaft comprising:
- rotating at least one sliding camshaft having at least one camshaft barrel;
- activating at least one actuator for engaging at least one position shifting slot in the at least one camshaft barrel to axially move the at least one camshaft barrel along the sliding camshaft; and
- detecting an axial position, an angular position, and an angular speed of the at least one camshaft barrel using at least one sensor;
- wherein detecting includes detecting a detection element formed on the at least one camshaft barrel, with the detection element having first, second, and third annular profiles indicative of an associated one of first, second, and third positions of the camshaft barrel.

18. The method of claim 17 wherein detecting includes using one of an optical sensor, an inductive sensor, a Hall effect sensor, and a magnetoresistive sensor for tracking the axial position of the camshaft barrel.

* * * * *